(12) United States Patent
Imai (10) Patent No.: US 7,043,743 B2
(45) Date of Patent: May 9, 2006

(54) DISK CARTRIDGE

(75) Inventor: Fumihito Imai, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/648,435

(22) Filed: Aug. 27, 2003

(65) Prior Publication Data

US 2004/0042384 A1    Mar. 4, 2004

(30) Foreign Application Priority Data

Aug. 28, 2002  (JP) .............................. 2002-248794

(51) Int. Cl.
*G11B 23/03* (2006.01)
(52) U.S. Cl. ..................................... 720/725
(58) Field of Classification Search ................ 720/719, 720/725, 726, 728, 732, 735, 738; 369/241
See application file for complete search history.

(56) References Cited

U.S. PATENT DOCUMENTS

| 6,274,844 | B1 * | 8/2001 | Beuch et al. ........... 219/121.64 |
| 6,445,677 | B1 * | 9/2002 | Park et al. ................... 720/738 |
| 6,463,029 | B1 * | 10/2002 | Nishino et al. ............. 720/725 |
| 6,473,392 | B1 * | 10/2002 | Shiomi et al. .............. 720/738 |
| 6,724,709 | B1 * | 4/2004 | Choi et al. ................... 720/738 |

* cited by examiner

*Primary Examiner*—William Korzuch
*Assistant Examiner*—Mark Blouin
(74) *Attorney, Agent, or Firm*—Sughrue Mion, PLLC

(57) ABSTRACT

A disk cartridge including a recording disk medium of diameter 2 inches or less and a housing. The housing is made up of a frame and upper and lower metal shells. The frame has a plurality of recesses in the side walls thereof, and the side walls of the upper and lower shells are provided with a plurality of elastic engagement pieces respectively engageable with the recesses. The housing is assembled by engagement of the elastic engagement pieces with the recesses.

4 Claims, 9 Drawing Sheets

DISK CARTRIDGE

BACKGROUND OF THE INVENTION

1. Field of the Invention

The present invention relates to a small disk cartridge in which a recording disk medium of diameter 50.8 mm (about 2 inches) or less is rotatably enclosed within a housing made up of a frame and upper and lower metal shells covering the top surface and bottom surface of the frame, and more particularly to the structure of the housing assembled.

2. Description of the Related Art

Figure 9:
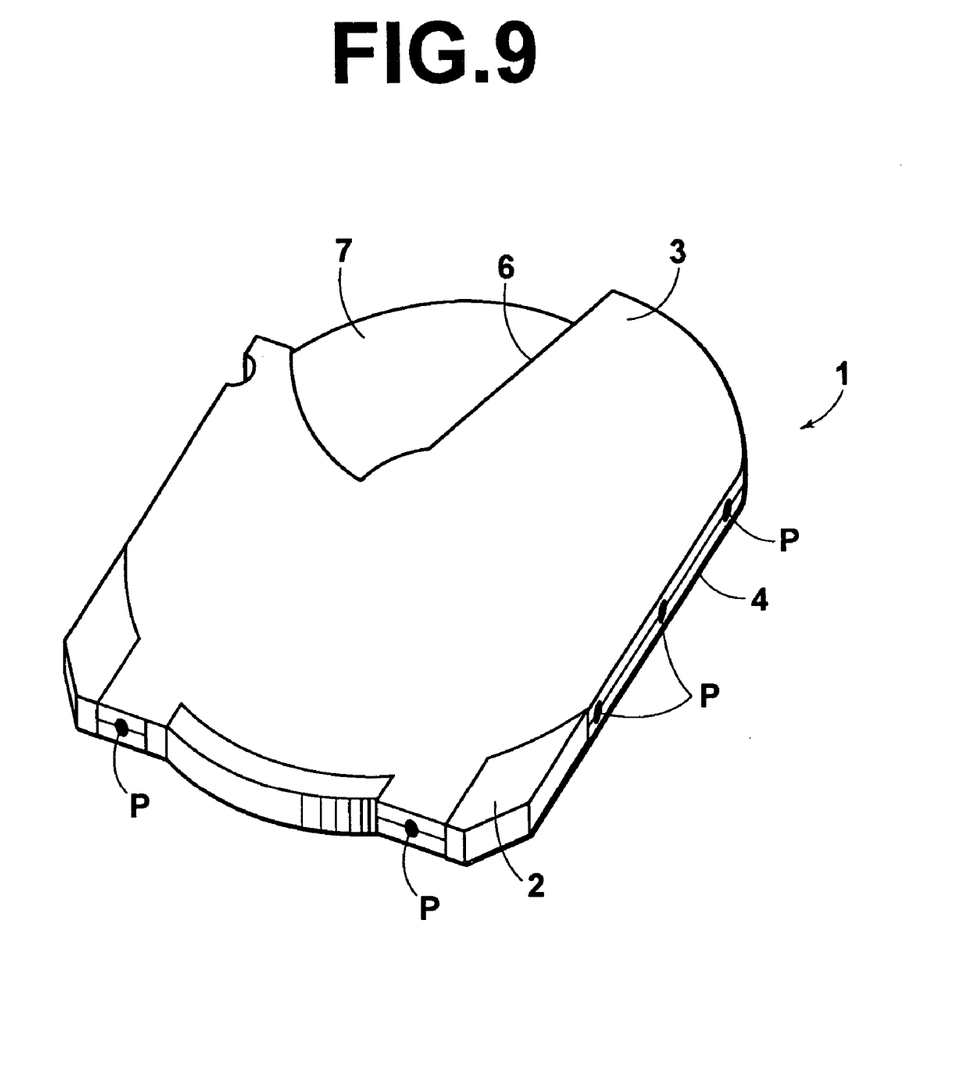
FIG. 9 is a perspective view showing a conventional disk cartridge.

In mobile equipment such as a digital camera, etc., a very small disk cartridge, called "clik!™" such as that schematically shown in FIG. 9, is being used as a recording medium. This disk cartridge 1 is 50 mm in width, 55 mm in depth, and 1.95 mm in thickness. It has a housing, which is made up of a resin frame 2 and upper and lower metal shells (stainless steel sheets of 0.2 mm in thickness) 3, 4. The housing rotatably encloses a magnetic disk of diameter 1.8 inch (about 45.7 mm) which has a recording capacity of 40 MB, and is equipped with a U-shaped hole 6 through which a magnetic head is positioned over a recording surface of the magnetic disk and a rotary shutter 7 that covers the U-shaped hole 6 when read and write operations are not performed. The upper and lower shells 3, 4 are laser welded at 10 or more positions (P) with the circumferential edges of the side walls engaged with each other.

In a magnetic disk cartridge (not shown) with a 3.5-inch (89-mm) floppy disk which is in wide use as a recording medium for personal computers, the upper and lower resin shells of the housing are assembled by ultrasonic bonding.

The structure of the assembled housing in the conventional disk cartridges described above, however, has the following problems: (1) an expensive, special machine such as a laser welding machine and an ultrasonic bonding machine is required and the upper and lower shells need to be precisely positioned so they are vertically aligned with each other; (2) paper or sputter dust occurs at the time of welding or bonding, adheres to a recording medium, and has an adverse influence on read and write operations, and also contaminates assembly space (which requires a class 100 to 1000 clean room); and (3) when disassembling the welded or bonded upper and lower shells for recycling or collection of classified refuse, the disassembly of them is fairly difficult and time-consuming, and since they are destroyed by disassembly, it is impossible to recycle them.

SUMMARY OF THE INVENTION

The present invention has been made in view of the circumstances described above. Accordingly, it is the object of the present invention to provide a structure of upper and lower shells which has fixed all the problems found in the prior art.

To achieve this end and in accordance with the present invention, there is provided a disk cartridge comprising a recording disk medium of diameter 2 inches or less and a housing. The housing is made up of a frame and upper and lower metal shells covering the top surface and bottom surface of the frame, and within the housing, the disk medium is rotatably enclosed. The frame has a plurality of recesses in the side walls thereof, and the side walls of the upper and lower shells are provided with a plurality of elastic engagement pieces respectively engageable with the recesses of the frame. The housing is assembled by engagement of the elastic engagement pieces with the recesses.

In one preferred form of the present invention, the elastic engagement pieces are constructed to be engageable with the recesses of the frame along a vertical direction. In that case, the side walls of one of the upper and lower shells may be further provided with elastic engagement pieces that are engageable directly with the side walls of the other of the upper and lower shells.

In another preferred form of the present invention, the recesses in the side wall of the frame maybe a slot extending along a longitudinal direction of the side wall. In this case, the elastic engagement pieces are inserted in the slot from the tip end side of the slot and are engaged with the slot.

In still another preferred form of the present invention, the elastic engagement pieces slide on the side walls of the frame along longitudinal directions of the side walls and are engaged with the recesses. In that case, the upper and lower shells may be formed from a shape memory alloy.

According to the present invention, the side walls of the upper and lower metal shells are provided with a plurality of elastic engagement pieces respectively engageable with the recesses of the frame, and the cartridge housing is assembled by engagement of the elastic engagement pieces with the recesses. Therefore, an expensive, specialized machine such as a laser welding machine is not required and the cartridge housing can be easily and precisely assembled. In addition, there is no possibility that paper or sputter dust, which can contaminate assembly circumstance and have an adverse influence on read and write operations, will occur during assembly. Moreover, when disassembling the upper and lower shells for recycling or collection of classified refuse, the disassembly of them is easy and recycling of them is possible. Furthermore, if the upper and lower shells are formed from a shape memory alloy, and the elastic engagement pieces are configured to disengage from the above-described recesses at a predetermined temperature higher than the operating temperature, disassembly of the housing can be facilitated by heating the elastic engagement pieces when disassembling the housing.

BRIEF DESCRIPTION OF THE DRAWINGS

The present invention will be described in further detail with reference to the accompanying drawings wherein:

FIGS. 2A-I to 2A-IV are front and sectional views showing how an elastic engagement piece formed on the side of an upper shell is engaged with a recess formed in a frame;

FIGS. 2B-I to 2B-IV are front and sectional views showing how an elastic engagement piece different from that of FIG. 2A is engaged with the recess;

FIGS. 2C-I to 2C-IV are front and sectional views showing how an elastic engagement piece different from that of FIG. 2A is engaged with the recess;

FIGS. 3A-I to 3A-IV are views similar to FIGS. 2A-I to 2A-IV showing an alteration of the elastic engagement piece shown in FIG. 2A;

FIGS. 3B-I to 3B-IV are views similar to FIGS. 2B-I to 2B-IV showing an alteration of the elastic engagement piece shown in FIG. 2B;

FIGS. 3C-I to 3C-IV are views similar to FIGS. 2C-I to 2C-IV showing an alteration of the elastic engagement piece shown in FIG. 2C;

FIGS. 5A-I and 5A-II are sectional and front views showing how an elastic engagement piece of a lower shell is engaged directly with an engagement portion of an upper shell;

FIGS. 5B-I and 5B-II are sectional and front views showing how an elastic engagement piece differing from that of FIG. 5A is engaged directly with an engagement portion of an upper shell;

FIGS. 5C-I and 5C-II are sectional and front views showing how an elastic engagement piece differing from that of FIG. 5A is engaged directly with an engagement portion of an upper shell;

DESCRIPTION OF THE PREFERRED EMBODIMENTS

Embodiments of the present invention will hereinafter be described in detail with reference to the drawings.

Figure 1:
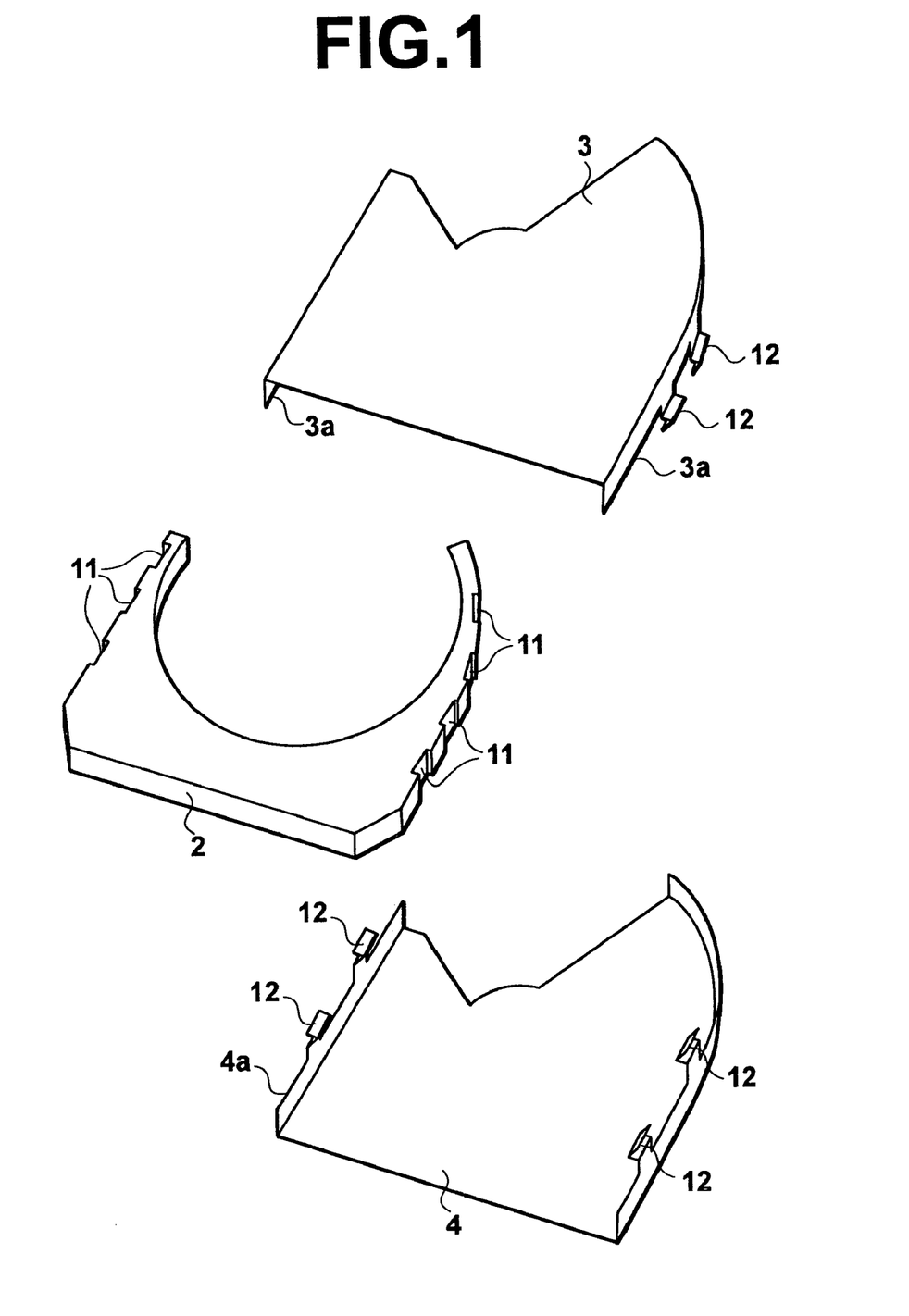
FIG. 1 is an exploded perspective view showing a disk cartridge housing constructed in accordance with a first embodiment of the present invention.

Referring to FIG. 1, there is shown a disk cartridge housing constructed in accordance with a first embodiment of the present invention. The cartridge housing is made up of a resin frame 2 of approximately the same dimensions as the magnetic disk cartridge 1 shown in FIG. 9, and upper and lower metal shells 3, 4 arranged to cover the top surface and bottom surface of the frame 2. From the viewpoint of availability and mechanical strength, it is desirable that the material of the upper and lower shells 3, 4 be a stainless steel sheet of thickness 0.15 to 0.2 mm, preferably 0.2 mm.

The frame 2 has arcuate arm portions inside which a disk (not shown) and a rotary shutter (not shown) are arranged. The outside walls of both arm portions are provided with a plurality of vertical recesses 11 extending between the top and bottom surfaces of the frame 2. The side walls of the upper shell 3 are provided with a plurality of elastic engagement pieces 12 extending downward from the lower edge 3a of each side wall, and the upper engagement pieces 12 are engageable with the recesses 11 and formed integrally with the upper shell 3. Similarly, the side walls of the lower shell 4 are provided with a plurality of elastic engagement pieces 12 extending upward from the upper edge 4a of each sidewall, and the lower engagement pieces 12 are engageable with the recesses 11 and formed integrally with the upper shell 4.

Figure 2A:
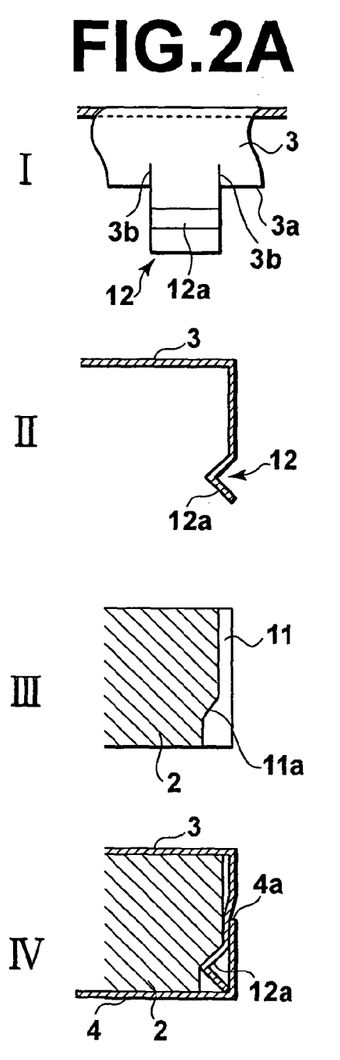
Figure 2B:
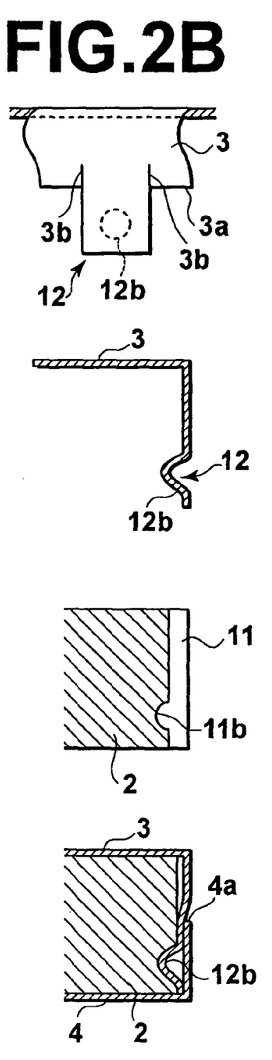
Figure 2C:
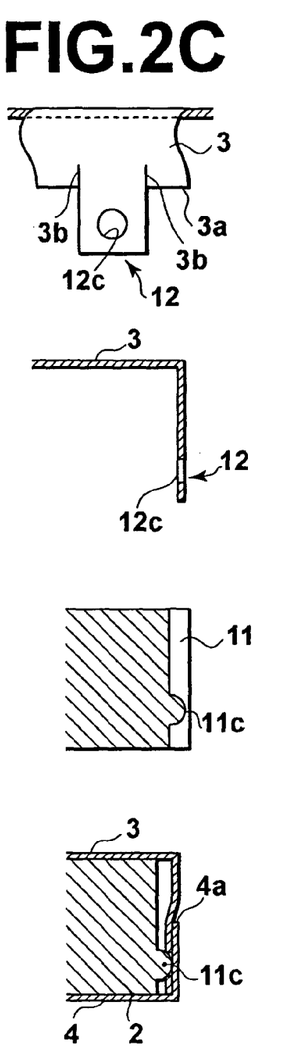

FIGS. 2A to 2C show three different elastic engagement pieces 12 formed on the side of the upper shell 3, and recesses 11 on the side of the frame 2 which are respectively engaged by the elastic engagement pieces 12. FIGS. 2A-I, 2B-I, and 2C-I show front views of the three different elastic engagement pieces 12, FIGS. 2A-II, 2B-II, and 2C-II show sectional views of the elastic engagement pieces 12, FIGS. 2A-III, 2B-III, and 2C-III show sectional views of the recesses 11 that are engaged by the elastic engagement pieces 12, and FIGS. 2A-IV, 2B-IV, and 2C-IV show the state in which the elastic engagement piece 12 is engaged with the recess 11, along with the lower shell 4.

The elastic engagement piece 12, shown in FIGS. 1 and 2A, is equipped with a claw 12a that protrudes inwardly, and the recess 11 in the frame 2 has a corresponding step portion 11a that is engaged by the claw 12a. The elastic engagement piece 12 shown in FIG. 2B is equipped with a protrusion 12b that extends inwardly, and the recess 11 in the frame 2 has a corresponding dent 11b in which the protrusion 12b is fitted. The elastic engagement piece 12 shown in FIG. 2C is equipped with an aperture 12c, and the recess 11 of the frame 2 has a corresponding protrusion 11c that is fitted in the aperture 12c.

As illustrated in FIGS. 2A-IV, 2B-IV, and 2C-IV, each elastic engagement piece 12 is inserted inside the lower shell 4 through the upper edge 4a of the lower shell 4, and to facilitate the insertion, the proximal portion of each elastic engagement piece 12 has slits 3b on both sides, as shown in FIGS. 2A-I, 2B-I, and 2C-I.

Figure 3A:
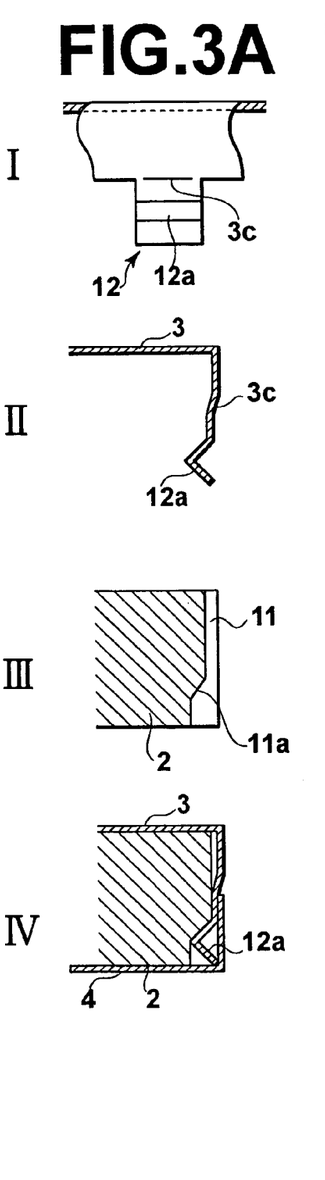
Figure 3B:
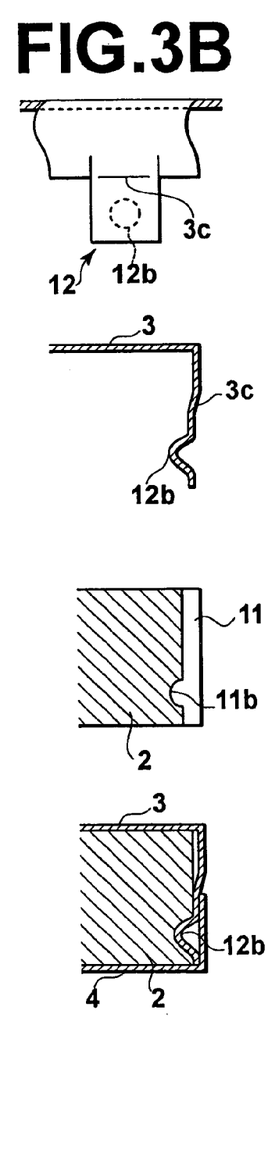
Figure 3C:
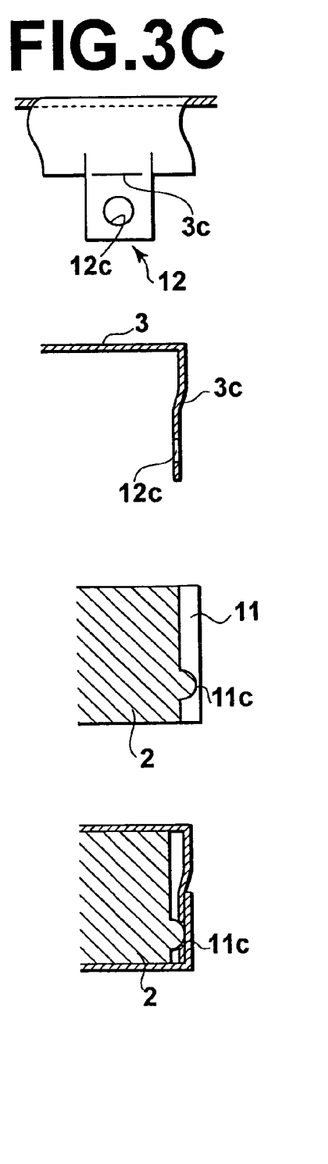

Instead of the slits 3b, the proximal portion of each elastic engagement piece 12 may have a step portion 3c, as shown in FIGS. 3A to 3C corresponding to FIGS. 2A to 2C. The step portion 3c is formed by bending the proximal portion of the elastic engagement piece 12 inside. This step portion 3c makes it easy to insert the elastic engagement piece 12 inside the lower shell 4 through the upper edge 4a of the lower shell 4.

Likewise, the lower shell 4 is provided with a plurality of elastic engagement pieces 12, which have the same construction as those of the upper shell 3. In addition to the recesses 11 to be engaged by the upper engagement pieces 12 of the upper shell 3, the frame 2 is further provided with recesses 11 that are engaged by the lower engagement pieces 12 of the lower shell 4, as illustrated in FIG. 1.

Figure 4:
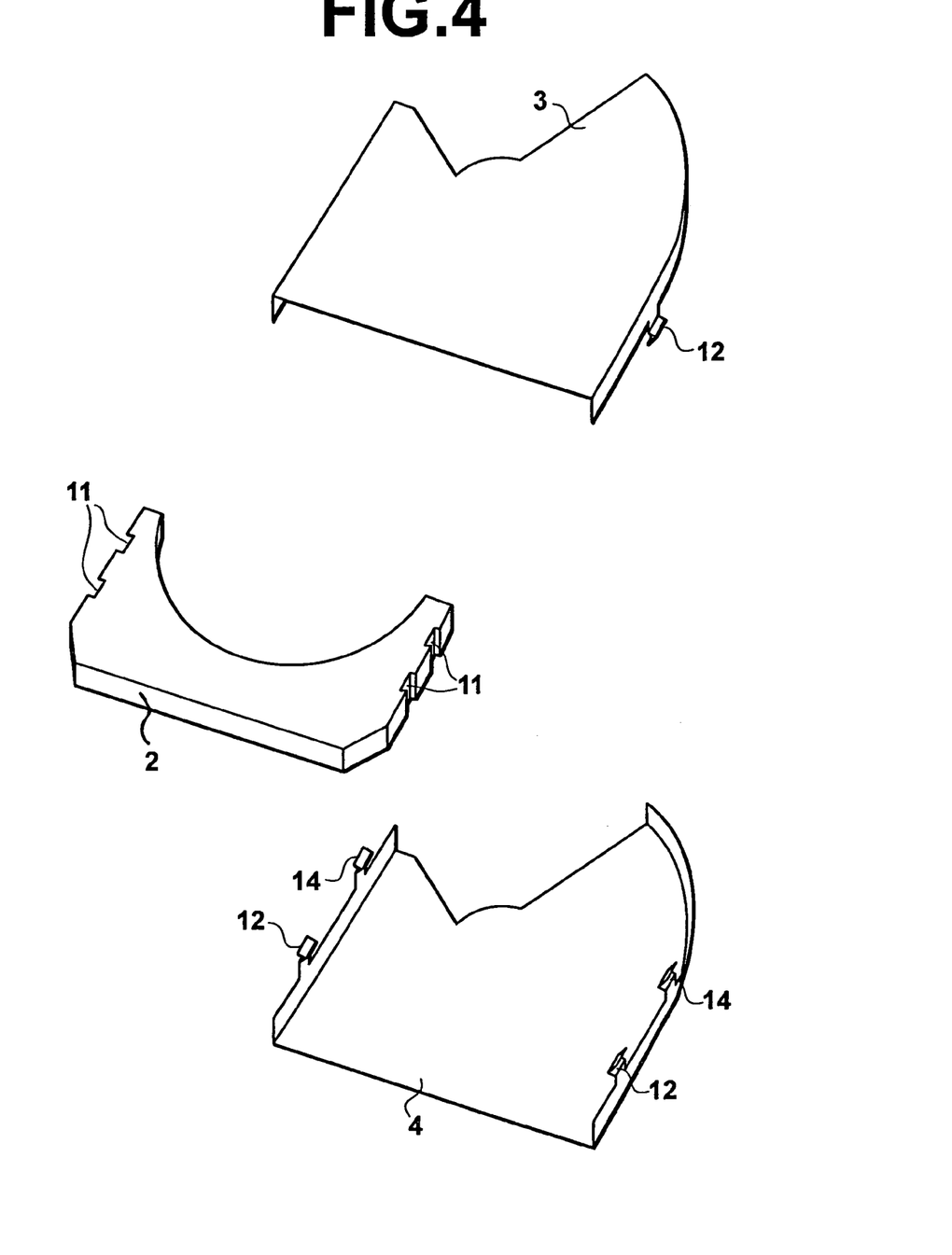
FIG. 4 is an exploded perspective view showing a disk cartridge housing constructed in accordance with a second embodiment of the present invention.

Referring to FIG. 4, there is shown a disk cartridge housing constructed in accordance with a second embodiment of the present invention. This embodiment is an alteration of the first embodiment described above. That is, the arm portions of a frame 2 are shorter than those of the first embodiment, and the number of recesses 11 that are formed in the side walls of the arm portions is reduced. Because of this, some of the elastic engagement pieces in one of the upper and lower shells are engaged directly with the side walls of the other shell.

Figure 5A:
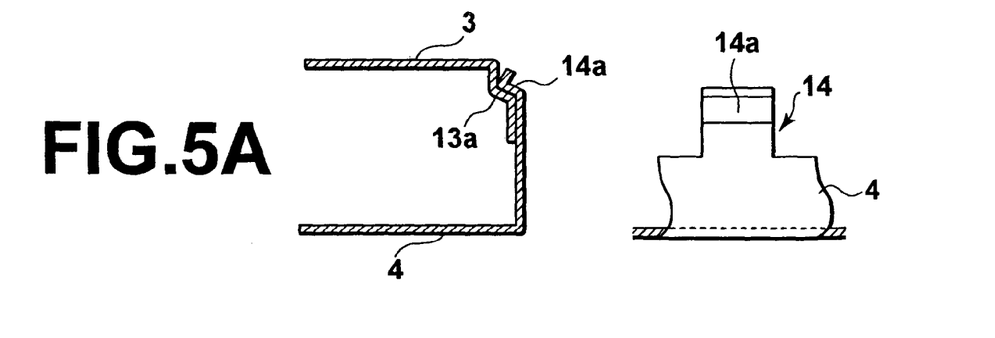
Figure 5B:
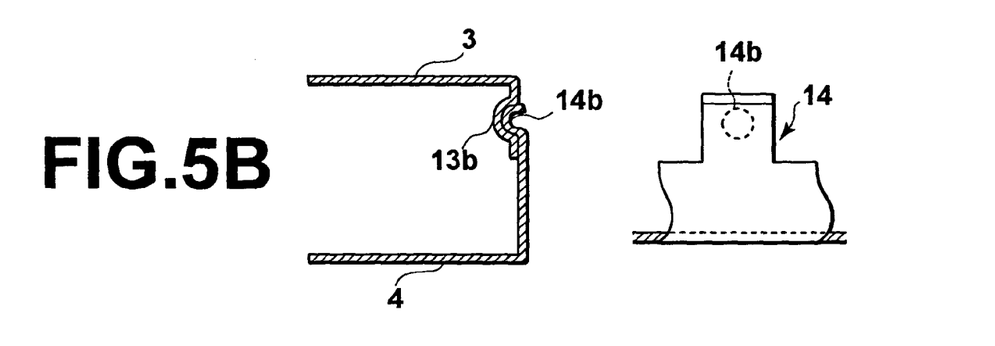
Figure 5C:
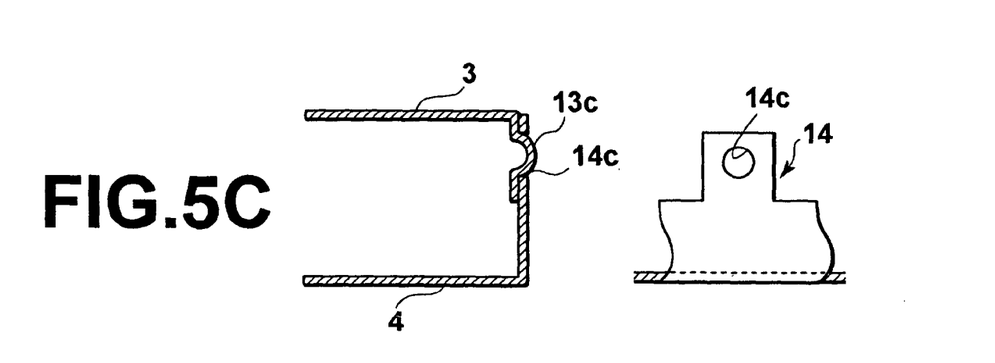

FIGS. 5A to 5C show three different elastic engagement pieces 14 formed on the side of the lower shell 4, and the engagement portions of the upper shell 3 which are respectively engaged by the elastic engagement pieces 14. FIGS. 5A-I, 5B-I, and 5C-I show sectional views of the engagement portions of the three different elastic engagement pieces 14. FIGS. 5A-II, 5B-II, and 5C-II show front views of the elastic engagement pieces 14.

The elastic engagement piece 14, shown in FIGS. 4 and 5A, is equipped with a claw 14a that projects inwardly, and the upper shell 3 has a corresponding step portion 13a that is engaged by the claw 14a. The elastic engagement piece 14 shown in FIG. 5B is equipped with a protrusion 14b that extends inwardly, and the upper shell 3 has a corresponding dent 13b in which the protrusion 14b is fitted. The elastic engagement piece 14 shown in FIG. 5C is equipped with an aperture 14c, and the upper shell 3 has a corresponding protrusion 13c that is fitted in the aperture 14c.

Figure 6:
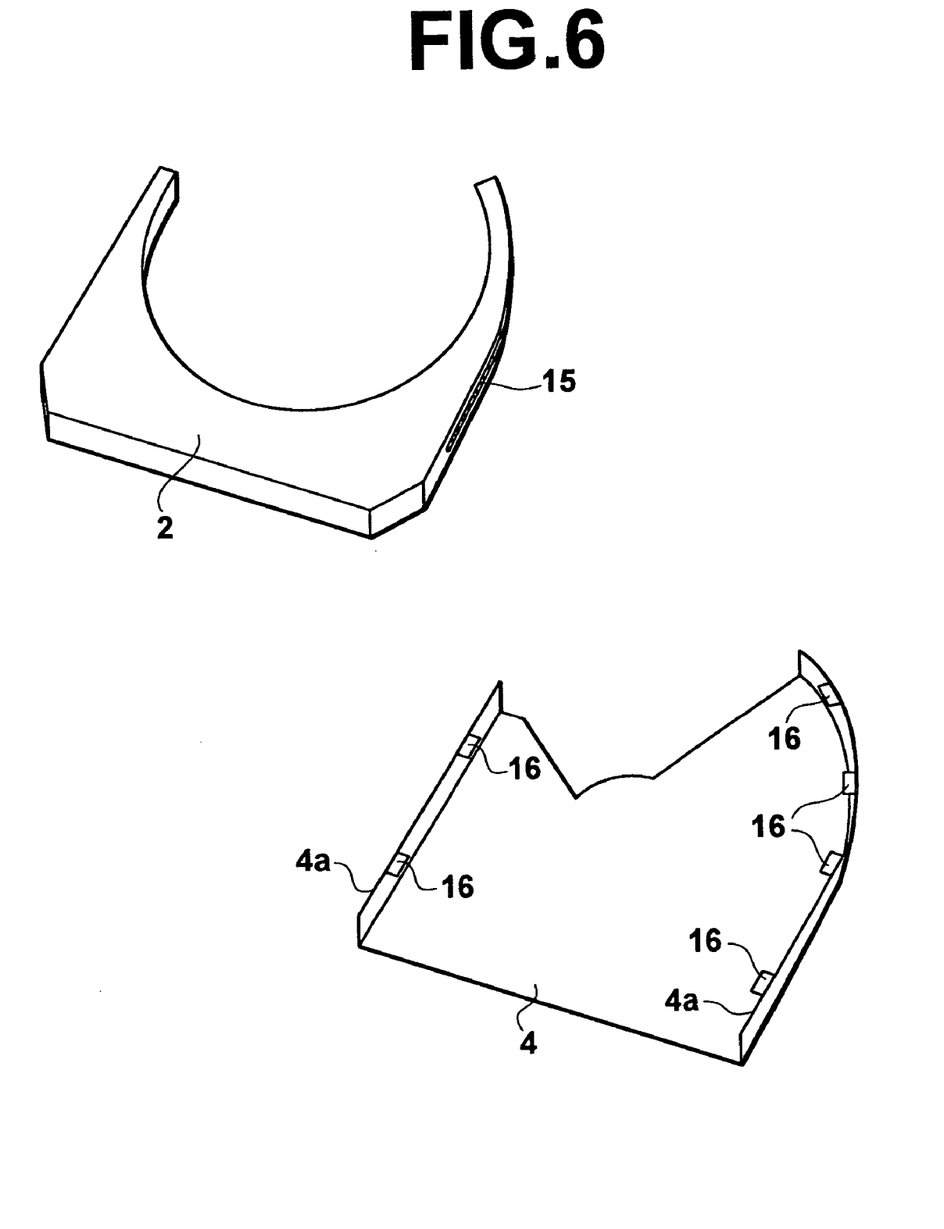
FIG. 6 is an exploded perspective view showing a disk cartridge housing constructed in accordance with a third embodiment of the present invention.

Referring to FIG. 6, there is shown a disk cartridge housing constructed in accordance with a third embodiment of the present invention. Note in the figure that an upper shell is omitted.

Figure 7A:
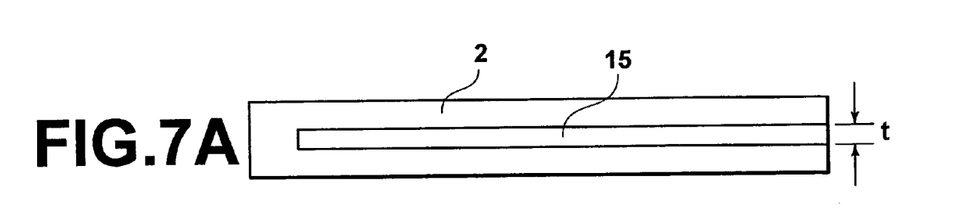
FIG. 7A is a front view of the slot shown in FIG. 6.

In the third embodiment, as illustrated in FIG. 7A, the side wall of each arm portion of a frame 2 is provided with a slot 15, which extends longitudinally from the tip end of the arm portion to the proximal portion. The lower edge 3a of an upper shell 3 (not shown) and the upper edge 4a of a lower shell 4 have elastic engagement pieces 16 bent inwardly at approximately a right angle. These elastic engagement pieces 16 are inserted in the slot 15 from the tip end side of the arm portion and are engaged with the slot 15. In this case, two parallel slots 15 may be provided for the upper shell 3 and lower shell 4, but from the viewpoint of miniaturization, one slot is preferred as shown in FIG. 7A. In that case, the width t of the slot 15 needs to be set to a value such that the elastic engagement pieces 16 of the upper and lower shells 3, 4 can be inserted.

Figure 7B:
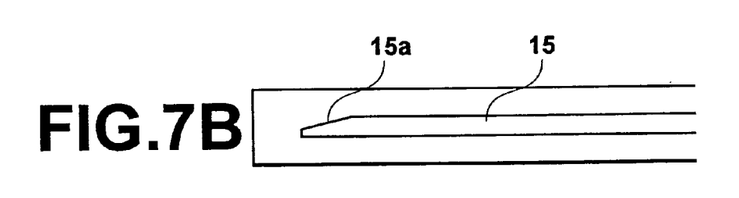
FIG. 7B is a front view showing an alteration of the slot.
Figure 7C:
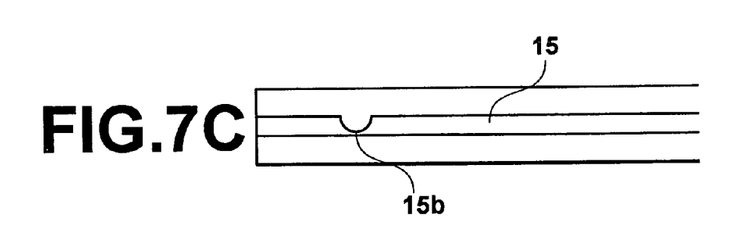
FIG. 7C is a front view showing another alteration of the slot.

As illustrated in FIG. 7B, the end portion of the slot 15 may be provided with an inclined portion 15a that narrows gradually. As the elastic engagement piece 16 is inserted in the slot 15, it is engaged with the inclined portion 15a. As illustrated in FIG. 7C, the slot 15 may be provided with a protrusion 15b. If an elastic engagement piece 16 with a hole (not shown) engageable with the protrusion 15b is inserted, it is engaged with the protrusion 15b.

Figure 8:
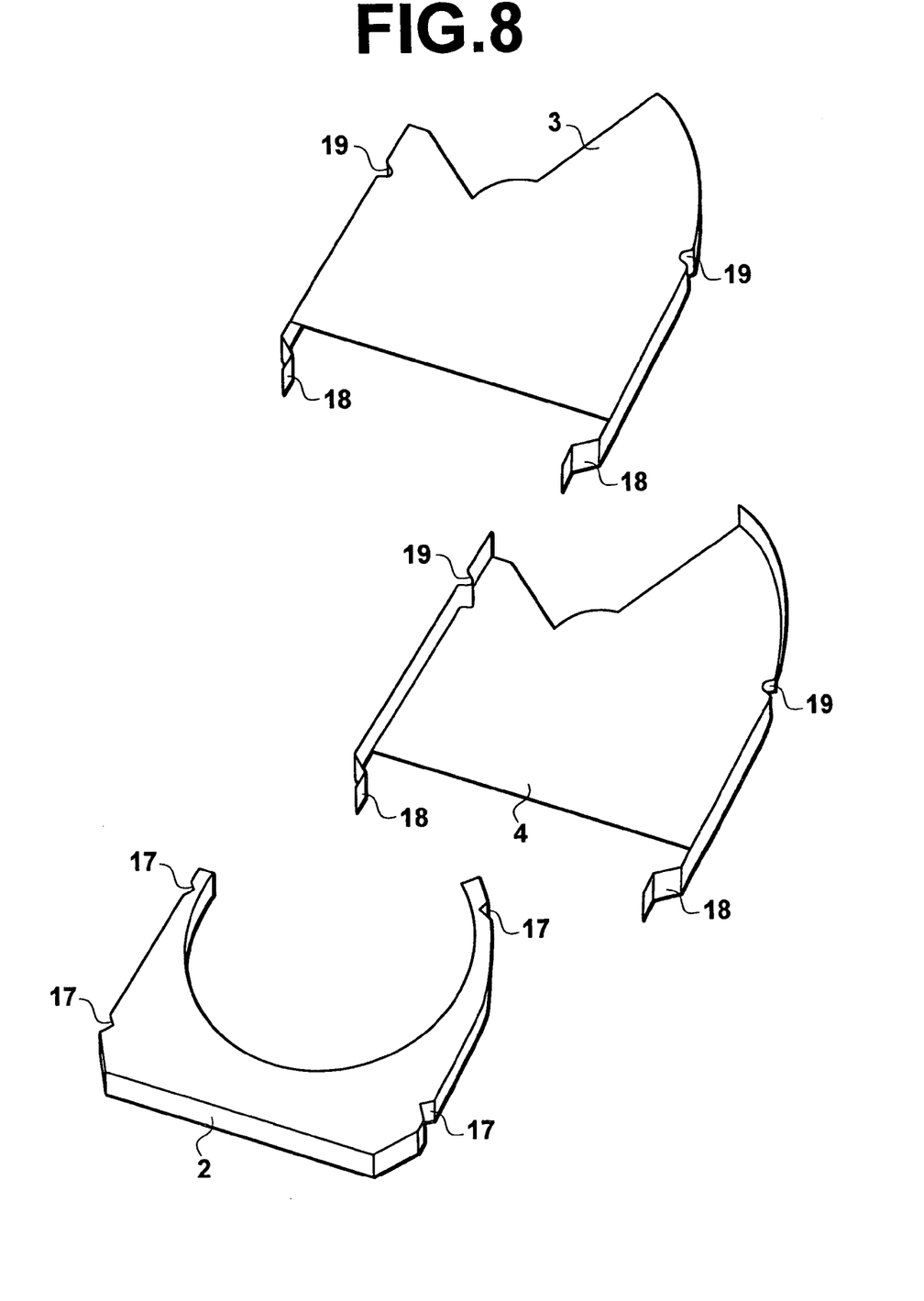
FIG. 8 is an exploded perspective view showing a disk cartridge housing constructed in accordance with a fourth embodiment of the present invention.

Referring to FIG. 8, there is depicted a disk cartridge housing constructed in accordance with a fourth embodiment of the present invention. In this embodiment, the side walls of a frame 2 have V-shaped notches 17, and upper and lower shells 3, 4 are provided with elastic engagement pieces 18 and elastic portions 19. The elastic engagement pieces 18 slide on both side walls of the frame 2 from the tip end side of each arm portion of the frame 2 and are fitted in the rear notches 17 formed in the proximal portions of the arm portions of the frame 2. The elastic portions 19 are fitted in the front notches 17 formed in the tip end portions of the arm portions of the frame 2. The engagement portion of each elastic engagement piece 18 may be formed as illustrated in FIGS. 2 and 3.

In the fourth embodiment, the upper and lower shells 3, 4 may be formed from a shape memory alloy such as a Co—Ni—Al system alloy. In that case, if the elastic engagement pieces 18 are constructed such that they are firmly fitted in the notches 17 at normal temperature and disengage from the notches 17 at a predetermined temperature higher than the operating temperature, for example, 80° C. or more, then disassembly of the housing can be facilitated by heating the elastic engagement pieces 18.

It is apparent that the above-described embodiments are all excellent in assembly and disassembly, do not contaminate assembly environment, and have no adverse influence on read and write operations.

While the present invention has been described with reference to the preferred embodiments thereof, the invention is not to be limited to the details given herein, but may be modified within the scope of the invention hereinafter claimed.

What is claimed is:

1. A disk cartridge comprising:
a recording disk medium of diameter 2 inches or less; and
a housing which is made up of a frame and upper and lower metal shells covering the top surface and bottom surface of said frame and in which said disk medium is rotatably enclosed;
wherein said frame has a plurality of recesses in side walls thereof;
wherein side walls of said upper and lower shells are provided with a plurality of elastic engagement pieces respectively engageable with the recesses of said frame;
wherein said housing is assembled and fixed together by engagement of said elastic engagement pieces with said recesses; and
wherein side walls of one of said upper and lower shells are further provided with elastic engagement pieces that are engageable directly with side walls of the other of said upper and lower shells.

2. A disk cartridge comprising:
a recording disk medium of diameter 2 inches or less; and
a housing which is made up of a frame and upper and lower metal shells covering the top surface and bottom surface of said frame and in which said disk medium is rotatably enclosed;
wherein said frame has a plurality of recesses in side walls thereof;
wherein side walls of said upper and lower shells are provided with a plurality of elastic engagement pieces respectively engageable with the recesses of said frame;
wherein said housing is assembled and fixed together by engagement of said elastic engagement pieces with said recesses; and
wherein
said recesses in the side wall of said frame are a slot extending along a longitudinal direction of said side wall, and
said elastic engagement pieces are inserted in said slot from a tip end side of said slot and are engaged with said slot.

3. A disk cartridge comprising:
a recording disk medium of diameter 2 inches or less; and
a housing which is made up of a frame and upper and lower metal shells covering the top surface and bottom surface of said frame and in which said disk medium is rotatably enclosed;
wherein said frame has a plurality of recesses in side walls thereof;
wherein side walls of said upper and lower shells are provided with a plurality of elastic engagement pieces respectively engageable with the recesses of said frame;
wherein said housing is assembled and fixed together by engagement of said elastic engagement pieces with said recesses; and
wherein said elastic engagement pieces slide on the side walls of said frame along longitudinal directions of said side walls and are engaged with said recesses.

4. The disk cartridge as set forth in claim 3, wherein said upper and lower shells are formed from a shape memory alloy.

* * * * *